United States Patent [19]
Schusterick

[11] Patent Number: 6,115,959
[45] Date of Patent: Sep. 12, 2000

[54] WICK INSERTION TOOL AND METHOD OF MAKING A WICK FOR POTTED PLANTS

[76] Inventor: Craig T. Schusterick, 1803 E. Ocean Blvd., Apt. #202, Long Beach, Calif. 90802

[21] Appl. No.: 09/093,069

[22] Filed: Jun. 8, 1998

Related U.S. Application Data

[63] Continuation-in-part of application No. 08/852,480, May 7, 1997, abandoned.

[51] Int. Cl.⁷ ................................................... A01G 25/00
[52] U.S. Cl. ............................................ 47/1.01 R; 47/81
[58] Field of Search ............................ 47/48.5, 81, 1.01; 66/117, 118

[56] References Cited

U.S. PATENT DOCUMENTS 4,271,563  6/1981  Theuman ..................................... 17/71
4,501,133  2/1985  Kretzschmar et al. ................... 66/117

*Primary Examiner*—Peter M. Poon
*Assistant Examiner*—Elizabeth Shaw
*Attorney, Agent, or Firm*—Jack C. Munro

[57] ABSTRACT

The method of making a nylon twine wick to which the twine wick is baked to a predetermined temperature for a predetermined length of time so that the strands of the wick will remain in their established position during insertion of the wick within the soil of a potted plant and usage of the wick. Insertion of the wick is accomplished by a thin rod tool which has a sharpened point at one end and an indentation formed in the sidewall of the tool directly adjacent the sharpened point. The wick is to be temporarily secured to the tool by being wrapped around the tool at the indentation with the tool to be inserted into the soil of the potted plant with the sharpened point leading, and when inserted to the desired amount, the tool is twisted causing release from the wick and then the tool is withdrawn leaving the wick in place.

5 Claims, 3 Drawing Sheets

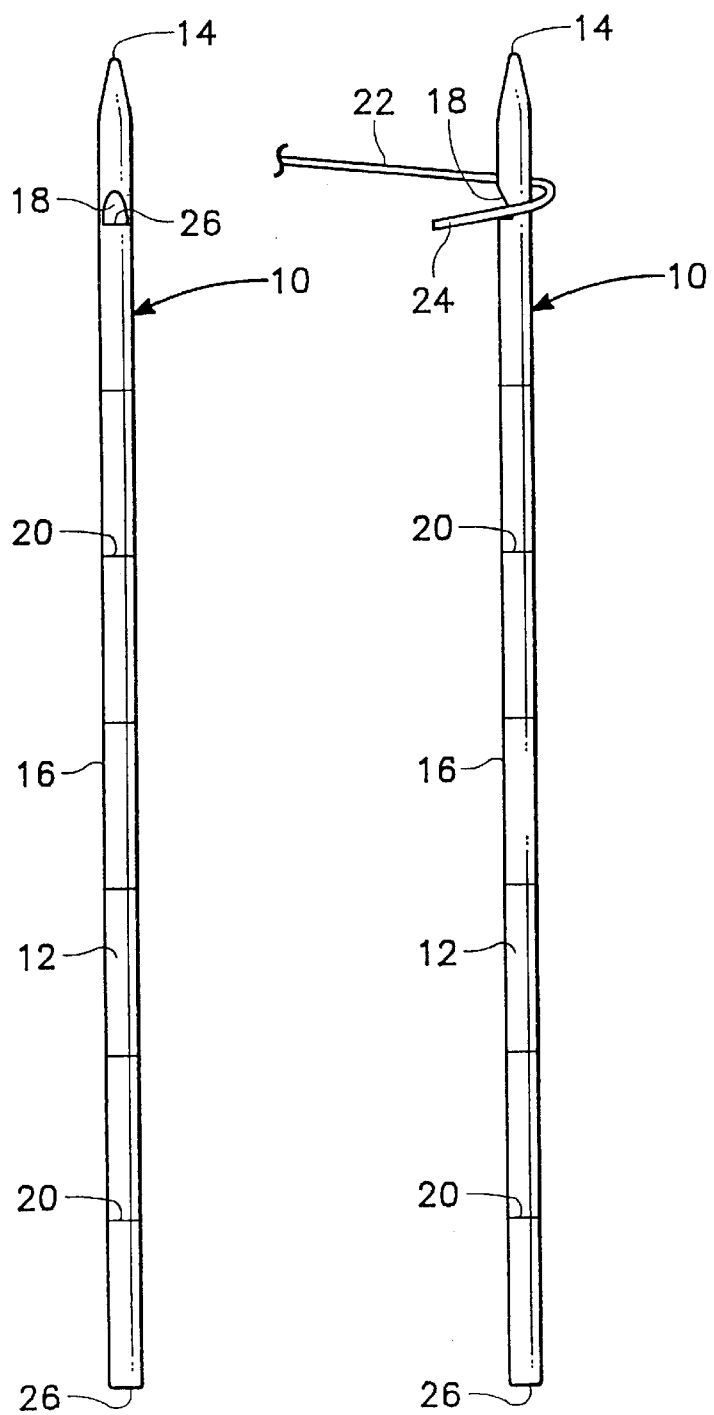
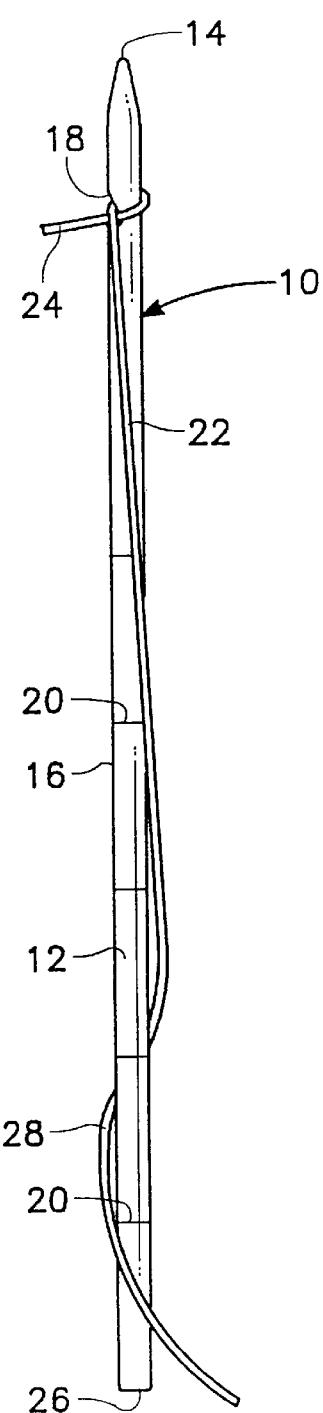
FIG. 1    FIG. 2    FIG. 3

WICK INSERTION TOOL AND METHOD OF MAKING A WICK FOR POTTED PLANTS

This application is deemed to be a continuation-in-part of U.S. patent application Ser. No. 08/852,480, filed May 7, 1997, entitled WICK INSERTION TOOL, by the present inventor, now abandoned.

BACKGROUND OF THE INVENTION

1) Field of the Invention

The field of this invention relates to growing of plants, and more particularly to a wick type of watering device for supplying of water to the plant within the pot.

2) Description of the Prior Art

A conventional method for watering of plants comprises adding water to the surface of the soil within the potted plant. This usually results in under watering or over watering of the plant which, in either case, results in death of the plant. In the past, it has been known to utilize a wick to eliminate over watering and under watering. A wick comprises a length of twine with one end of the twine being inserted into the soil of the potted plant, and the opposite end submerged within a water reservoir. The water flows by capillary action through the twine to then be released within the potted plant. This method of watering, known as wick-watering, supplies water into the soil only as needed, thus preventing over watering. Additionally, the reservoir generally is capable of supplying water to the plant over a period of several weeks helping to alleviate the possibility of under watering such as might occur when owners of a home are on an extended vacation. While wick-watering offers an improvement over conventional watering, prior methods of wick-watering have had several disadvantages. One of the most common ways to water by wick is to place the wick in conjunction with an insertion tool and then imbed the insertion tool within the plant pot. The disadvantage to this process is that the insertion tool remains fixed within the potted plant. Once the tool is used to insert the wick, there is no further purpose of the wick. Also, there has to be utilized a wick for each potted plant, and it is not uncommon for most homeowners to have ten, twenty or thirty potted plants, which means there has to be an equal number of wick insertion tools. This can result in being a significant, unnecessary expense.

Also, wick insertion tools of the prior art commonly insert the wick at a prescribed depth for each and every plant. For some plants, it is desirable to insert the wick only a slight distance from the bottom of the pot, further, other plants it is desirable to insert the wick some distance from the bottom, and still further plants insert the wick almost to the surface of the soil in the pot. Within the prior art type of wick insertion devices, there is no way to adjust this different depth insertion.

Also, leaving of the wick insertion probe within the soil of the plant may cause root damage of the plant over a period of time.

SUMMARY OF THE INVENTION

One of the objectives of the present invention is to utilize a wick insertion tool for inserting a wick within a potted plant wherein the depth of insertion can be readily varied according to individual needs.

Another objective of the present invention is to construct a wick insertion tool wherein the procedure for installing the wick is simple and can be achieved by even the most unskilled individual.

Another objective of the present invention is to utilize a wick insertion tool that can be reused from pot-to-pot thereby eliminating the need for more than one insertion tool per potted plant.

Another objective of the present invention is to construct a wick insertion tool that is inexpensive.

Another objective of the present invention is to construct a wick insertion tool that can be used to insert the wick in practically any size potted plant, planter or the like.

Another objective of the present invention is to construct a wick insertion tool which provides for precise and proper insertion of the wick into the plant soil.

The method of this invention is directed to making a nylon twine wick to be used with a potted plant where the twine wick is baked at an elevated temperature (between two hundred degrees Fahrenheit to three hundred twenty-five degrees Fahrenheit) for the time period of between three and seven hours. The baking will substantially prevent the twine wick from unraveling. The wick is to be inserted into the soil of a potted plant by an insertion tool of this invention. The insertion tool comprises a thin, elongated rod which has a sharpened point at its outer end and an indentation in the sidewall of the tool. The indentation is located directly adjacent the sharpened point. The wick is to be temporarily secured to the tool by being wrapped around the tool at the indentation with the tool to be inserted into the soil of the potted plant with the sharpened point leading, and when inserted to the desired amount, the tool is twisted causing release from the wick and then the tool is withdrawn leaving the wick in place.

BRIEF DESCRIPTION OF THE DRAWINGS

FIG. 1 is a front view of the wick insertion tool of the present invention;

FIG. 2 is a right side view of the wick insertion tool of the present invention showing initiating of the temporary securing of the wick onto the wick insertion tool;

FIG. 3 is a right side elevational view similar to FIG. 2 showing the wick in the completely temporarily secured position in conjunction with the tool;

DETAILED DESCRIPTION OF THE PREFERRED EMBODIMENT

Figure 4:
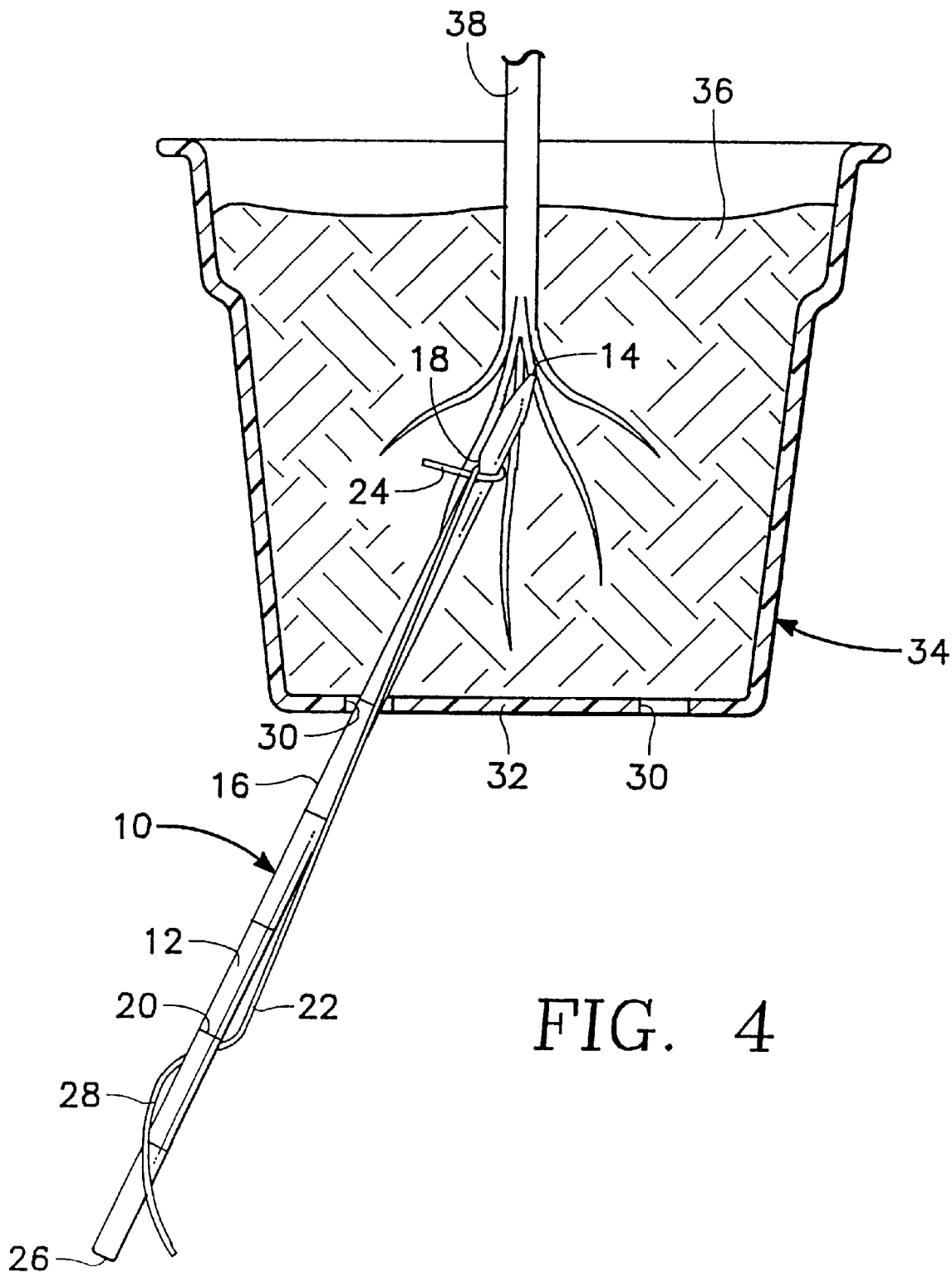
FIG. 4 is a cross-sectional view depicting usage of the tool to install a wick within the potted plant.

Referring particularly to FIG. 1, there is shown the wick insertion tool 10 of this invention. The wick insertion tool 10 comprises an elongated, rigid body 12 which would generally be in the range of eight to twelve inches in length. The body 12 is in the shape of a thin, circular shaped rod. One end of the rod is formed into a sharpened point 14. Approximately one inch from the area of the sharpened point 14, and formed within the sidewall 16 of the body 12, is an indentation 18. The indentation 18 comprises an L-shaped notch which has lineal edges defining the limits of ledge 26. Inscribed along the longitudinal length of the body 12 is length indicating indicia in the form of a plurality of lines 20. The first of the lines 20 is in alignment with the lower edge of the indentation 18. This should indicate a distance from that and the end of the sharpened point 14 of approximately one inch. The next line 20 is one inch spaced from the line 20 that is in alignment with the indentation 18, and so forth along the entire longitudinal length of the body 12. The purpose of the lines 20 will be explained further on in the specification.

A twine wick 22 is to be wrapped around the sidewall 16 of the body 12 in the area of the indentation 18. The free end 24 of the wick 22 is placed against the ledge 26 of the indentation 18. The wick 22 is then wrapped around the body 20 and then pulled in a direction toward the ledge 26 of the insertion tool 10 which causes the wick to bite into the lineal edges that defines the limits of the ledge 26. This causes a binding action pressing the free end 24 against the ledge 26 which produces a temporary securement of the wick 22 to the tool 10. The wick 22 is then loosely wrapped again, as shown at 28, about the body 12 which provides just enough force to maintain this temporary securement of the free end 24 in contact with the ledge 26. The user then grasps the body 12 and inserts the sharpened point 14 through a weep hole 30 formed in the bottom 32 of a potted plant 34. The user is to make a prior decision how far the wick 22 is to be inserted within the soil 36 of the potted plant 34 prior to insertion of the wick 22, a plant 38 is placed within the soil 36. Let it be assumed that it has been predetermined to insert the wick 22 approximately three inches within the soil 36. The individual doing the insertion knows that when the wick 22 is wrapped around the indentation 18 that there is approximately one inch of the wick 22 that is used. This means that the if the user locates the third line 20 from the sharpened point 14 in alignment with the weep hole 30, that the wick 22 will be inserted to the desired depth.

Figure 5:
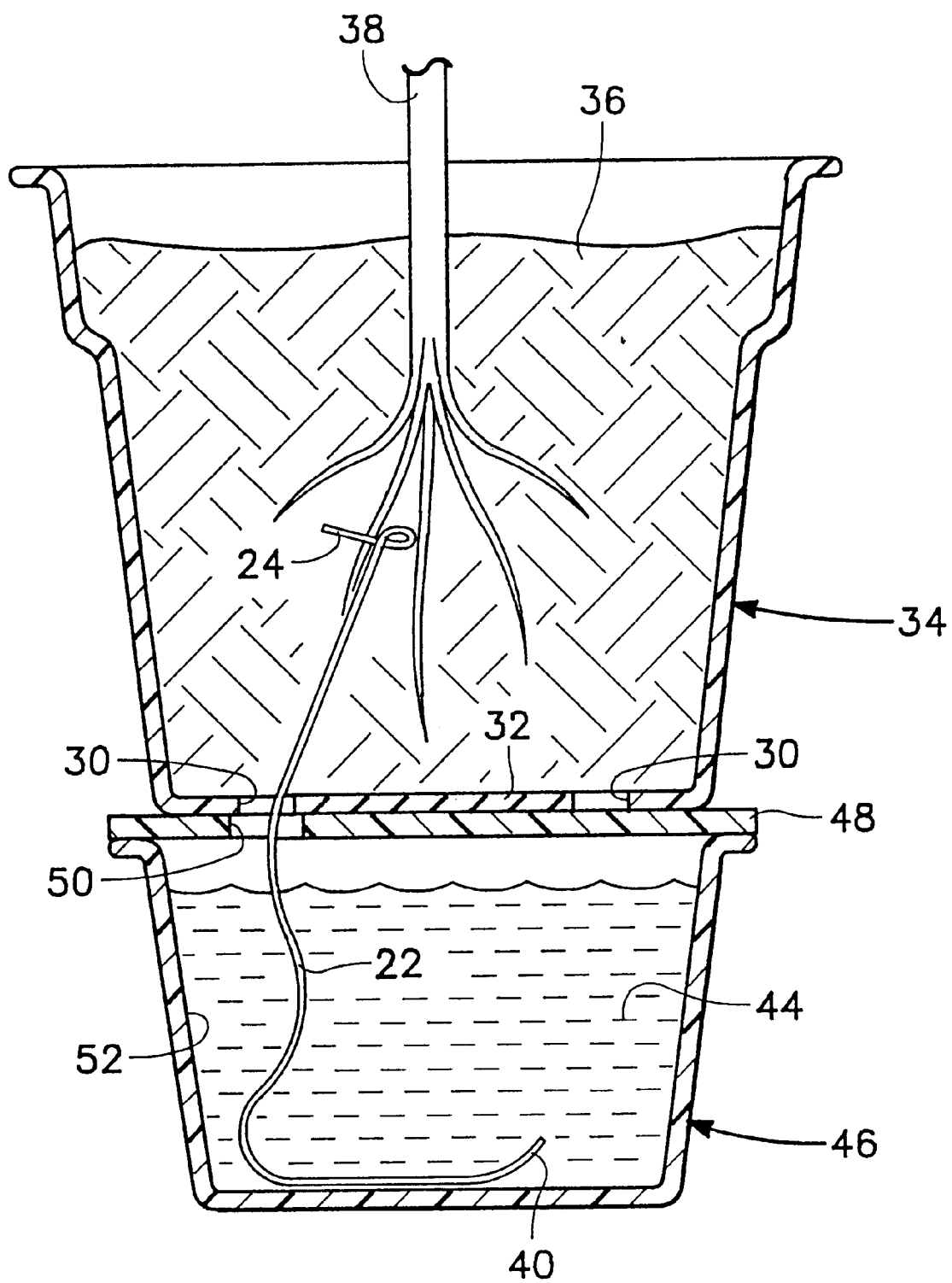
FIG. 5 is a cross-sectional view showing the wick in its installed/usage position in conjunction with the potted plant.

Once the wick 22 has been inserted to the desired depth, the user only needs to twist, in a clockwise direction, the tool 10 which will result in the temporary securement being released between the tool 10 and wick 22. The tool 10 can then be withdrawn from the soil 36 and the potted plant 34 leaving in place the wick 22 as shown in FIG. 5 of the drawings.

It is necessary that the lower end 40 of the wick 22 be placed within water 44 of a water reservoir 46. One way in which this occurs is to locate the pot 34 on a lid 48 of the reservoir 46. A hole 50 of the lid 48 is to be located substantially in alignment with the weep hole 30 through which the wick 22 is conducted. The lower end 40 merely rests within the internal chamber 52 of the reservoir 46 in contact with the water 44. The water 44 can then be drawn by capillary action up toward the free end 24 and be deposited within the soil 36 thereby watering of the plant 38.

The wick 22 is to be constructed of a nylon. Nylon is intended to include any thermal plastic polyamide, and is also to include rayon as well as other synthetic textile fibers. Generally, there is a mass of fibers such as twenty or thirty fibers for each wick 22. These fibers are twisted so that the wick 22 will assume the shape of a length of twine or thread. It has been discovered that a polyester blend for the wick 22 will perform satisfactorily. However, nylon appears to be absolutely the best material for moving of the most water from the internal chamber 52 into the soil 36. Cotton, jute and seine have been discovered to be of poor quality when used as a wick 22.

One disadvantage of the nylon is that it does have a tendency to unravel, and during the normal installing position of the wick 22, it might have a tendency to do so. To avoid this, the wick 22, before it is cut into its desired length from a storage roll, which might have between three hundred to eleven hundred feet in length of nylon, is to be placed within an oven and baked within a range of two hundred to three hundred and twenty five degrees Fahrenheit for a period of time of between three to seven hours. The preferable temperature and time period has been found to be two hundred fifty degrees for a period of six and one-half hours.

The tool 10 can be constructed of any rigid material such as wood, plastic or the like. It is common in conjunction with the soil of one particular plant, that there may be small insects, fungus or algae. To avoid transferring and contaminating multiple potted plants when utilizing tool 10 of this invention, the tool 10 can be sterilized after each usage. Sterilization could be accomplished by soaking of the tool 10 in hydrogen peroxide.

The baking of the wick 22 causes the individual strands to be somewhat welded together thereby maintaining the integrity of the wick 22. A typical size of the wick 22 would be about one-sixteenth to one-eighth inch in diameter. Actually, a number eighteen wick has been found to be preferable for smaller sized pots which are from four to eight inches in diameter with the number twenty-four type of wick 22 being desirable for larger pots which are ten inches in diameter and larger.

It is to be understood that when utilizing of the wick 22 of this invention that a constant flow of water is to be supplied to the soil 46. The term "water" in the context of the present invention, will be understood to comprise water, water to which fertilizer and nutrients have been added, or any other liquid which is beneficial to plant growth and which can be transported by the capillary action through the wick 22.

What is claimed is:

1. A tool for inserting a wick into a potted plant comprising:
    an elongated body in the shape of a thin rod, said body having a sidewall, said body having a sharpened point at one end, an indentation formed in said sidewall, said indentation comprising an L-shaped notch not extending around said body, said L-shaped notch having lineal edges, said indentation located directly adjacent said sharpened point, whereby a wick is to be temporarily secured to said body by being wrapped around said body at said indentation with said wick biting into said lineal edges when inserted and then in a direction into a potted plant said body inserted a predetermined distance into said potted plant with said sharpened point leading, and then said body is to be twisted releasing such from said wick and then withdrawing said body from the potted plant leaving said wick imbedded within said potted plant.

2. A tool as defined in claim 1 wherein:
    said wick being constructed of a mass of twisted fibers.

3. The tool as defined in claim 2 wherein:
    said wick being constructed of nylon.

4. A tool for inserting a wick into a potted plant comprising:
    an elongated body in the shape of a thin rod, said body having a sidewall, said body having a sharpened point at one end, an indentation formed in said sidewall, said indentation located directly adjacent said sharpened point, whereby a wick is to be temporarily secured to said body by being wrapped around said body at said indentation and then said body inserted a predetermined distance into a potted plant with said sharpened point leading, and then said body is to be twisted releasing such from said wick and then withdrawing said body from the potted plant leaving said wick imbedded within said potted plant; and
    said sidewall includes length indicating indicia.

5. A The tool as defined in claim 4 wherein:
    said length indicating indicia comprising a plurality of evenly spaced apart inscribed lines with the distance between each pair of lines being known.

* * * * *